United States Patent
Burger et al.

(10) Patent No.: US 9,547,496 B2
(45) Date of Patent: Jan. 17, 2017

(54) ENERGY EFFICIENT MULTI-MODAL INSTRUCTION ISSUE

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 14/074,566

(22) Filed: Nov. 7, 2013

(65) Prior Publication Data

US 2015/0127928 A1 May 7, 2015

(51) Int. Cl.
G06F 9/00 (2006.01)
G06F 9/44 (2006.01)
G06F 9/38 (2006.01)

(52) U.S. Cl.
CPC ................. G06F 9/3836 (2013.01)

(58) Field of Classification Search
None
See application file for complete search history.

(56) References Cited

U.S. PATENT DOCUMENTS

| | | | |
|---|---|---|---|
| 8,037,366 B2 | 10/2011 | Abernathy et al. | |
| 2002/0087806 A1* | 7/2002 | Gharachorloo | G06F 12/0826 711/141 |
| 2004/0154006 A1* | 8/2004 | Heishi | G06F 8/4432 717/140 |
| 2007/0186081 A1* | 8/2007 | Chaudhry | G06F 9/30181 712/214 |
| 2007/0273699 A1 | 11/2007 | Sasaki et al. | |
| 2008/0082788 A1 | 4/2008 | Veidenbaum et al. | |
| 2011/0161632 A1 | 6/2011 | Sha et al. | |
| 2011/0320766 A1 | 12/2011 | Wu et al. | |
| 2012/0185714 A1* | 7/2012 | Chung | G06F 1/3203 713/323 |
| 2012/0278593 A1 | 11/2012 | Clark et al. | |
| 2013/0111191 A1 | 5/2013 | Murray et al. | |
| 2013/0297910 A1* | 11/2013 | Smolens | G06F 9/3851 712/205 |
| 2014/0281402 A1* | 9/2014 | Comparan | G06F 9/30189 712/214 |

(Continued)

OTHER PUBLICATIONS

Bai et al, "A Low Power In-Order/Out-of-Order Issue Queue," ACM Transactions on Architecture and Code Optimization, vol. 1, No. 2, Apr. 2004, pp. 1-28.

(Continued)

*Primary Examiner* — Michael Sun
(74) *Attorney, Agent, or Firm* — Gregg W. Wisdom; Micky Minhas

(57) ABSTRACT

A processor is described herein that is configured to switch between a first instruction issue mode of the processor and a second instruction issue mode of the processor based at least in part on a characteristic associated with a plurality of instructions. The first instruction issue mode and the second instruction issue mode are associated with different energy consumption characteristics. Also, the first instruction issue mode may be an out-of-order instruction issue mode and the second instruction issue mode may be an in-order instruction issue mode.

13 Claims, 6 Drawing Sheets

(56) References Cited

U.S. PATENT DOCUMENTS

2015/0052305 A1\* 2/2015 Kimura ................ G06F 9/3834
711/125

OTHER PUBLICATIONS

Grochowski et al, "Energy per Instruction Trends in Intel Microprocessors," In Technology@ Intel Magazine, vol. 4, Issue 3, Mar. 2006, 4 pgs.

Hilton et al, "BOLT: Energy-Efficient Out-of-Order Latency-Tolerant Execution," Proceedings of High Performance Computer Architecture (HPCA)-16 (2010), Jan. 9-14, 2010, pp. 1-12.

Pericas et al, "Chained In-Order/Out-of-Order DoubleCore Architecture," 17th International Symposium on Computer Architecture and High Performance Computing, SBAC-PAD 2005, Oct. 24-27, 2005, 12 pgs.

"International Search Report and Written Opinion Issued in PCT Patent Application No. PCT/US2014/063613", Mailed Date: Feb. 6, 2015, 8 Pages.

"Second Written Opinion Issued in PCT Patent Application No. PCT/US2014/063613", Mailed Date: Jul. 22, 2015, 5 Pages.

"International Preliminary Report on Patentability Issued in PCT Application No. PCT/US2014/063613", Mailed Date: Feb. 11, 2016, 6 Pages.

\* cited by examiner

ENERGY EFFICIENT MULTI-MODAL INSTRUCTION ISSUE

BACKGROUND

Different instruction issue modes have different power and performance trade-offs. Processors with logic units implementing in-order instruction issue modes issue instructions in the order they are fetched, allowing for a simple, energy efficient pipeline. While energy efficient, in-order instruction issue modes exhibit lower performance than out-of-order instruction issue modes because the in-order instruction issue modes must stall on miss events (e.g., waiting for an operand that has not been written back to an operand buffer or written to a registry file).

Processors with logic units implementing out-of-order instruction issue modes execute instructions based on their dependencies, providing higher performance by tolerating dynamic latencies. Out-of-order instruction issue modes, however, consume more energy than in-order instruction issue modes, as logic units implementing out-of-order instruction issue modes are more complex than logic units implementing in-order instruction issue modes. For instance, they must be able to perform dynamic scheduling, which consumes additional power.

SUMMARY

This application describes a processor configured to switch between instruction issue modes associated with different energy consumption characteristics. The instruction issue modes may include an out-of-order instruction issue mode and an in-order instruction issue mode and may be implemented by different logic units of the processor. Circuitry of the processor may switch between the instruction issue modes by switching between these logic units. Also, the processor may be configured to determine a characteristic associated with a plurality of instructions, such as an atomic instruction block, and to switch the instruction issue mode based at least in part on the determined characteristic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

This disclosure describes a processor configured to switch between instruction issue modes associated with different energy consumption characteristics. The processor may be further configured to fetch instructions, such as an atomic instruction block, and determine a characteristic associated with those instructions. Based at least in part on that characteristic, the processor may switch the instruction issue mode, and use the switched-to instruction issue mode to select instructions from an instruction window of the processor. In some embodiments, the processor may be configured to switch between an out-of-order instruction issue mode and an in-order instruction issue mode.

In various embodiments, each instruction issue mode may be associated with a different logical unit of the processor, and the processor may include circuitry that switches between the logic units. Such circuitry may include, for instance, an input line to one of the logic units, that input line coupled to a clock gate. In addition to an input for a clock signal, the clock gate may include an input line which transmits a signal indicative of the appropriate instruction issue mode. When the input of that line matches the instruction issue mode of the logic unit, and when a clock signal is received, the logic unit is activated.

The processor may set the input to the clock gate based on the determined characteristic. In some embodiments, the characteristic may comprise a static hint, such as metadata included with the fetched instruction. Alternatively, the characteristic may be determined by a logical AND of such a static hint and a charge state of the computing device that includes the processor. In further embodiments, the characteristic may by determined by a table of the processor. Such a table may include entries for sets of instructions, such as atomic instruction blocks, and counts associated with each set of instructions. In such embodiments, the characteristic may be a binary value indicating whether the count meets or exceeds a threshold. The count may in turn by built based on occurrences of some event or events. For example, the count may be incremented when instructions of the set of instructions issue in order and decremented when instructions of the set of instructions issue out of order. In yet further embodiments, the characteristic may be set based on whether the next instructions in the instruction window are ready to issue in order. In such embodiments, one of the logic units may examine the instructions in the instruction window, provide the input based on that examination to the clock gate (either directly or through an inverter), which may then activate or not activate the other logic unit based on that input.

Example Computing Device

Figure 1:
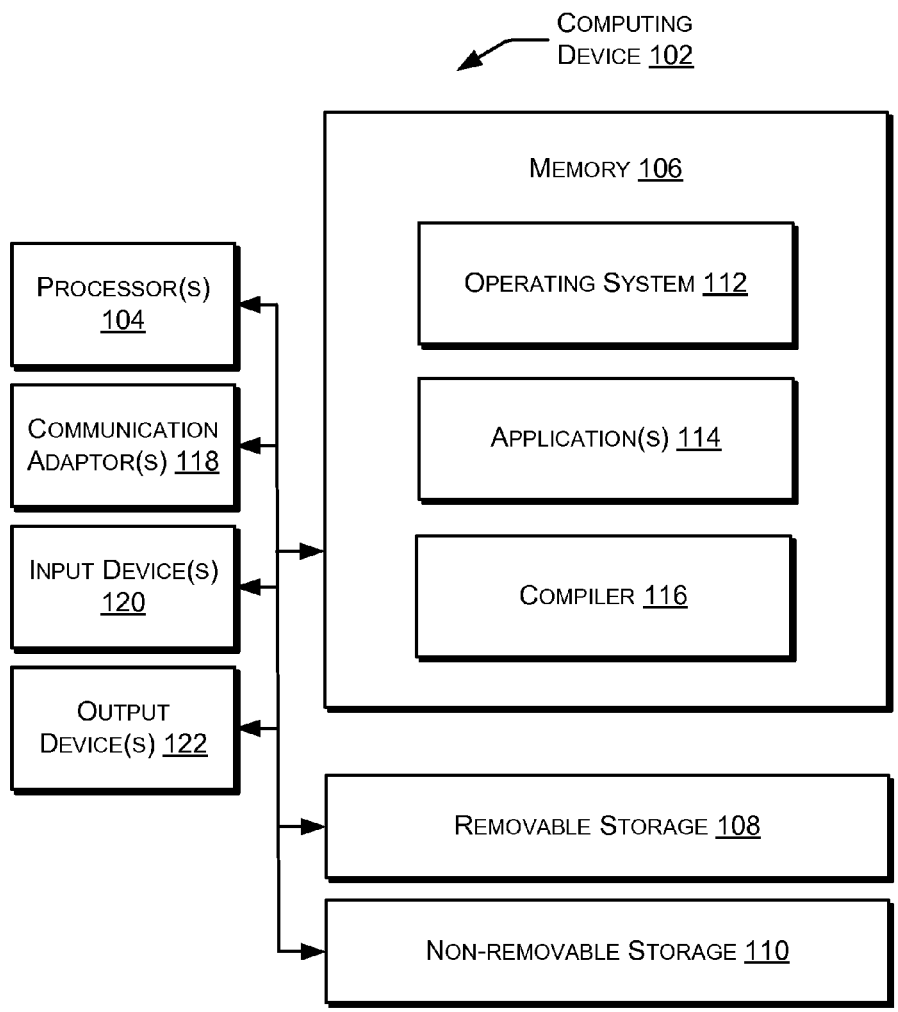
FIG. 1 is a block diagram of an example computing device with a processor that is configured to switch between instruction issue modes associated with different energy consumption characteristics.

FIG. 1 is a block diagram of an example computing device with a processor that is configured to switch between instruction issue modes associated with different energy consumption characteristics. In various embodiments, the computing device 102 may be any sort of computing device. For example, the computing device 102 may be a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device.

As shown, the computing device 102 may comprise one or more processor(s) 104. Processor(s) 104 may be any known processors and/or may include one or more central processing units (CPUs) or graphic processing units (GPUs). The processor(s) 104 include at least one processor 104 that is configured to switch between instruction issue modes associated with different energy consumption characteristics. A portion of a microarchitecture of such a processor 104 is illustrated in FIGS. 2A-2D and is described below in greater detail with reference to those figures.

In some embodiments, the processor 104 configured to switch between instruction issue modes may utilize an Explicit Data Graph Execution (EDGE) instruction set architecture (ISA). The EDGE ISA provides a richer interface between the compiler and the processor microarchitecture by directly expressing the data flow graph (e.g., a directed acyclic graph) that the compiler generates internally in an atomic instruction block. Doing this avoids processor rediscovery of data dependencies at runtime. The EDGE ISA further supports direct instruction communication in which the processor delivers a producer instruction's output directly as an input to a consumer instruction rather than writing the output to shared memory, such as a registry file.

In further embodiments, the processor 104 utilizing the EDGE ISA may have a Tera-op, Reliable, Intelligently-adaptive Processing System (TRIPS) architecture. The TRIPS architecture is one instantiation of the EDGE ISA. A processor 104 having a TRIPS architecture may comprise an L2 cache and a plurality of processor cores. In some embodiments, the number of processor cores utilized may be dynamic at runtime. Each processor core may in turn comprise an array of execution nodes, instruction cache(s), data cache(s), and ports into the L2 cache. Each execution node may include an arithmetic logic unit (ALU) and instruction buffers, and the ALUs may be general purpose to accommodate integers, floating points, etc. The compiler may map instructions of an atomic instruction block to ones of the execution nodes to enable simultaneous execution of a large number of instructions. Both the EDGE ISA and the TRIPs architecture are described in greater detail in "Scaling to the End of Silicon with EDGE Architectures," D. Burger, S. W. Keckler, K. S. McKinley, et al. *IEEE Computer,* 37(7), pp 44-55, July, 2004.

Memory 106 may store program instructions that are loadable and executable on the processor(s) 104, as well as data generated during the execution of these programs. Depending on the configuration and type of computing device, memory 106 may be volatile (such as random access memory (RAM)) and/or non-volatile (such as read-only memory (ROM), flash memory, etc.). The computing device may also include additional removable storage 108 and/or non-removable storage 110 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 106 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Turning to the contents of the memory 106 in more detail, the memory 106 may include an operating system 112, application(s) 114, and a compiler 116. The operating system 112 may be any sort of computing device operating system, and the application(s) 114 may each represent any one or more modules, applications, processes, threads, or functions.

The compiler 116 may produce EDGE binaries or TRIPS binaries—atomic instruction blocks for execution on an EDGE/TRIPS processor. Each atomic instruction block is fetched, executed, and committed atomically. These atomic instruction blocks may, for instance, be hyperblocks of one hundred twenty eight instructions, and the compiler 116 may map these instructions of the atomic instruction blocks to execution nodes of a processor core. To generate an atomic instruction block, the compiler 116 parses program code (e.g., code of an application 114) and constructs a control flow graph from the program code. The compiler 116 then unrolls loops and inline functions to produce unrolled control flow graphs. Next, the compiler 116 forms atomic instruction blocks based on the unrolled control flow graphs, inserts predicates, generates the binaries, and allocates registers. In addition to the above operations to generate atomic instruction blocks, the compiler 116 may determine whether instructions of a given atomic instruction block are suitable for in order execution and may include a static hint indicative of that determination as metadata for the atomic instruction block stored in a header of the atomic instruction block. Examples of compiler 116 are described in greater detail in "Scaling to the End of Silicon with EDGE Architectures" (citation provided above).

The memory 106 may further store data associated with and used by the operating system 112, the application(s) 114, and the compiler 116, as well as modules for performing other operations.

The computing device 102 may also contain communications adaptor(s) 118 that allow the computing device 102 to communicate with a stored database, another computing device or server, user terminals, and/or other devices on a network. The computing device 102 may also include input device(s) 120, such as a keyboard, a mouse, a stylus, a voice input device, a touch input device (including, e.g., a touch-sensitive display), etc., and output device(s) 122, such as a display, speakers, a vibrating mechanism, a tactile feedback mechanism, or ports for one or more peripheral devices (e.g., headphones, peripheral speakers, peripheral displays, or printers).

Example Processor Microarchitectures

FIGS. 2A-2D are diagrams of a portion of a processor microarchitecture including logic units associated with different instruction issue modes and circuitry for switching between those logic units. The processor microarchitecture portion may be part of a processor microarchitecture of one of the processor(s) 104 of the computing device 102. As mentioned above, processor(s) 104 may implement the EDGE ISA and may have a TRIPS architecture. The portion of the processor microarchitecture depicted in FIGS. 2A-2D may be part of such a TRIPS architecture or of another architecture instantiating the EDGE ISA.

As illustrated in FIGS. 2A-2D, an atomic instruction block 202, including a plurality of instructions 204 and metadata 206 may be fetched by front-end unit 208. The atomic instruction block 202, as mentioned above, may be fetched, executed, and committed atomically. These atomic instruction blocks may, for instance, be hyperblocks of one hundred twenty eight instructions and may be output by an EDGE ISA compiler.

The instructions 204 may each be EDGE instructions including an op code (e.g., a code indicating an operation associated with the instruction, such as "add") and identifications of one or more target instructions. Target instructions are consumers of the output of the instruction and use that output as an operand. These instructions 204 do not specify their source operands. Rather, the instructions 204 are associated with operand buffers which store operands of the instructions 204 and ready bits for each operand to indicate whether their respective operands have been written to.

As further mentioned above, the metadata 206 may be included in a header of the atomic instruction block 202 and may comprise a static hint about the suitability of the instructions 204 of the atomic instruction block 202 for in order execution. The metadata 206 may have been determined and specified by an EDGE compiler, such as the compiler 116.

In alternative embodiments, the front end logic unit 208 may fetch instructions which are not associated with any sort of atomic instruction block 202 and which are not EDGE instructions. Such instructions may include instructions of any other ISA, such as a Complex Instruction Set Computing (CISC) ISA or a Reduced Instruction Set Computing (RISC) ISA.

In various embodiments, the front end logic unit 208 may include logic for fetching, decoding and dispatching instructions. For example, the front end logic 208 may include an instruction fetch unit 210 configured to fetch an instruction 204 of the atomic instruction block 202. The instruction fetch unit 210 may further be configured to load the address of the fetched instruction 204 into an Instruction Fetch Address Register, also known as an "IFAR" (not shown). The address loaded into IFAR may be an effective address representing an address from a program or compiler, such as the compiler 116. The instruction 204 corresponding to the received effective address may be accessed from an instruction cache, also known as an "I-Cache" unit (not shown). Instructions 204 may be inputted to the I-Cache unit from a system memory (e.g., memory of the computing device 102) through a bus interface unit (not shown).

Instructions 204 from the I-Cache unit may be outputted to an Instruction Dispatch Unit (IDU) 212 of the front end logic unit 208. The IDU 212 may be configured to decode these received instructions 204. The IDU 212 may further comprise an instruction sequencer configured to forward the decoded instructions 204 in an order determined by various algorithms.

These instructions 204 may be forwarded to an instruction window 214. The instruction window 214 includes all instructions 204 that have been fetched but are not yet committed. Each instruction 204 in the instruction window 214 may include a bit indicating whether the instruction 204 is ready to issue. An instruction 204 that has already issued will not be indicated as "ready to issue." The bit may indicate that an instruction 204 is ready to issue when that instruction 204 has received all of its operands. In some embodiments, rather than a single bit associated with each instruction 204, logic units may determine which instructions 204 in the instruction window 214 are ready to issue by performing, for instruction 204, a logical AND of ready bits associated in memory (e.g., the I-Cache) with each operand and predicate of that instruction 204. The instruction window 214 may include all or some subset of the instructions 204 of the atomic instruction block 202. For example, if the atomic instruction block 202 includes one hundred twenty eight instructions 204, the instruction window 214 may include one hundred twenty eight instructions 204.

In various embodiments, as shown in FIGS. 2A-2D, the processor microarchitecture may include a plurality of logic units for selecting instructions 204 to issue from the instruction window 214, such as the next instruction logic unit 218 and the select logic unit 220. The next instruction logic unit 218 may be a logic unit implementing an in-order instruction issue mode. Such a next instruction logic unit 218 may select instructions 204 from the instruction window 214 in linear order. If one or more of the instructions 204 to be issued are not ready (e.g., have not received their operands), the next instruction logic unit 218 will stall until the instructions 204 are ready and will then issue those instructions 204. The next instruction logic unit 218 may select multiple instructions 204 for issue at a time. For instance the next instruction logic unit 218 could select the next two unissued instructions 204 as the instructions 204 to issue. The next instruction logic unit 218 then routes these issued instructions 204 through multiplexers (MUX) 222 to execution units 224. The next instruction logic unit 218 may be relatively energy efficient due to its simple logic but may have relatively poor performance because it will stall when waiting for unready instructions 204 to become ready.

In some embodiments, the select logic unit 220 may be a logic unit implementing an out-of-order instruction issue mode. Such a select logic unit 220 may select the next ready instructions 204 from the instruction window 214 to issue, which often will result in instructions 204 being selected out of their linear order. To select the next ready instructions 204, the select logic unit 220 may be configured to search over the instruction window 214 for the next ready instructions 204 and to select those instructions 204 to issue. The select logic unit 220 may select multiple instructions 204 for issue at a time. For instance the select logic unit 220 could select the next two ready, unissued instructions 204 as the instructions 204 to issue. The select logic unit 220 then routes these issued instructions 204 through MUX 222 to execution units 224. The select logic unit 220 may have relatively good performance because it avoids stalls on unready instructions 204 but may have relatively poor energy efficiency because of the large number of signals coming in from the instruction window 214 to enable the search over the instruction window 214 and because of its speed criticality.

The processor microarchitecture may comprise the same number of MUX 222 as the number of instructions 204 issued per clock cycle. Continuing with the above example, if two instructions 204 are issued per clock cycle, the processor microarchitecture may include MUX 222. Each of the MUX 222 has two input lines, each of the two input lines coupled to a different one of the next instruction logic unit 218 and the select logic unit 220. Each MUX 222 also has a control line indicating which of the next instruction logic unit 218 and the select logic unit 220 that that MUX 222 will be receiving input from. This control line may be the same line which provides input indicative of whether the next instructions 204 in the instruction window 214 are suitable for in order execution. The MUX 222 then transmit their received, issued instructions 204 to execution units 224.

In various embodiments, the execution units 224 may include ALUs 226 and one or more other execution units 228, such as fixed point units, load/store units, and floating point units. Each execution unit 224 may execute one or more of the instructions 204 received from the MUX 222. The ALUs 226 may be general purpose ALUs, capable of executing instructions with integer operands, floating point operands, etc. The execution units 224 may retrieve source operands for instructions 204 from operand buffers or registers and output results of the instructions 204 to operand buffers (e.g., to operand fields for target/consumer instructions of the instruction 204 being executed) or to a registry file.

In further embodiments, the processor microarchitecture includes circuitry clock gating the select logic unit 220 such that the select logic unit 220 only sees the clock signal (i.e., is activated) when a clock gate 230 receives a clock signal on a clock input line 232 and another input on another input line. The other input may be indicative of whether the next instructions 204 in the instruction window 214 are suitable for in order execution. Because the select logic unit 220 should be activated only when the next instructions 204 in the instruction window 214 are not suitable for in order execution, the other line may be coupled to the clock gate 230 through an inverter.

Each of FIG. 2A, FIG. 2B, FIG. 2C, and FIG. 2D illustrates a different source of the other input to the other input line of the clock gate 230. While these are shown as separate, alternative processor microarchitectures, it is to be understood that any or all of them may be combined in a processor microarchitecture, with multiple lines associated with multiple sources coupled by an OR gate which is, in turn, coupled to the clock gate 230.

Figure 2A:
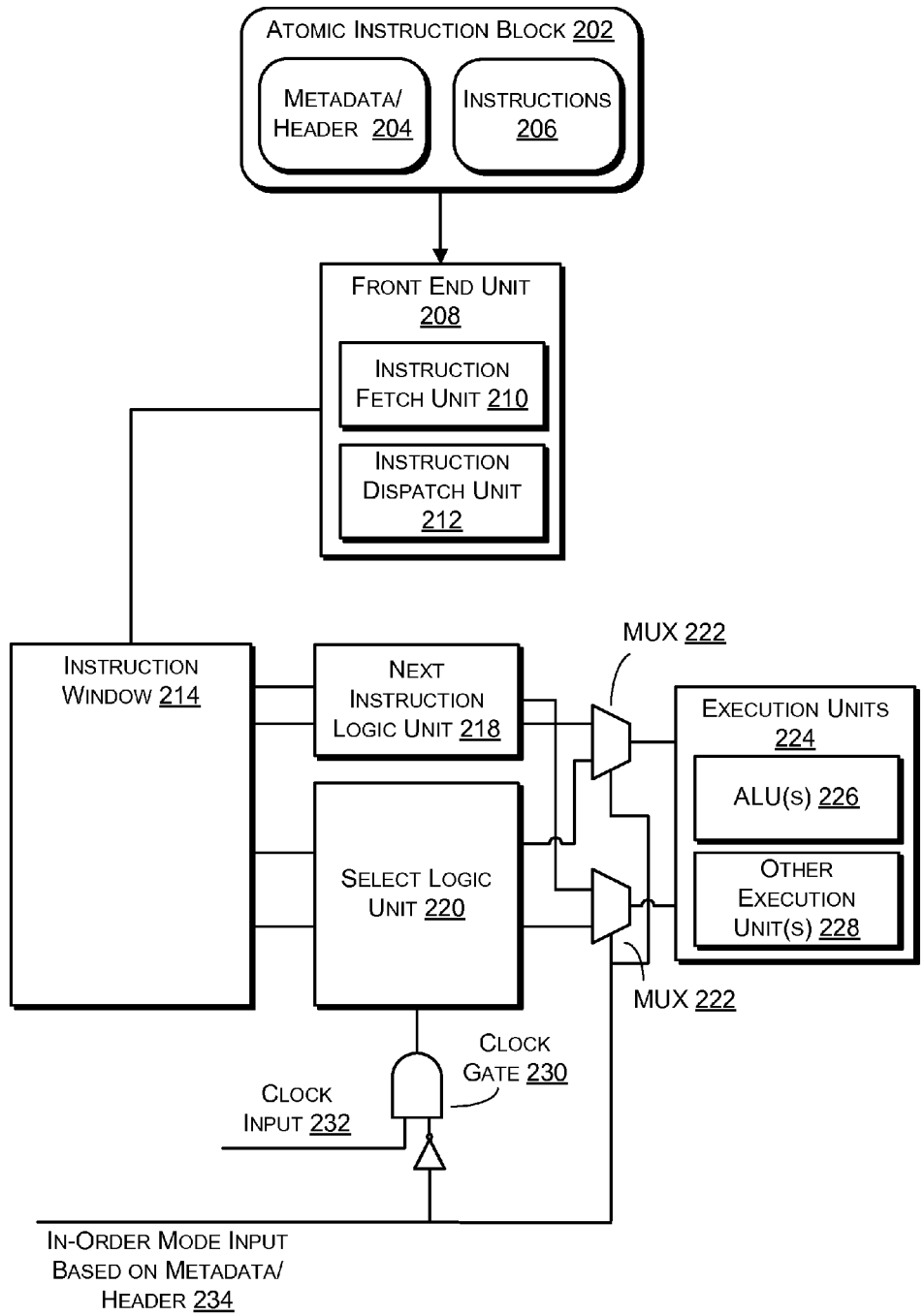
FIGS. 2A-2D are diagrams of a portion of a processor microarchitecture including logic units associated with different instruction issue modes and circuitry for switching between those logic units.

In FIG. 2A, the other input line 234 indicates whether the instructions 204 are suitable for in-order execution based on a static hint, such as metadata 206 of an atomic instruction block header. As mentioned above, such a static hint may have been specified by a compiler 116 and may simply be a binary value, although it may be other value types. The other input line 234 may indicate that the instructions 204 are suitable for in-order execution with a '1' and not suitable with a '0' (or vice versa), the '1' or '0' corresponding to the binary value included in the metadata 206.

Figure 2B:
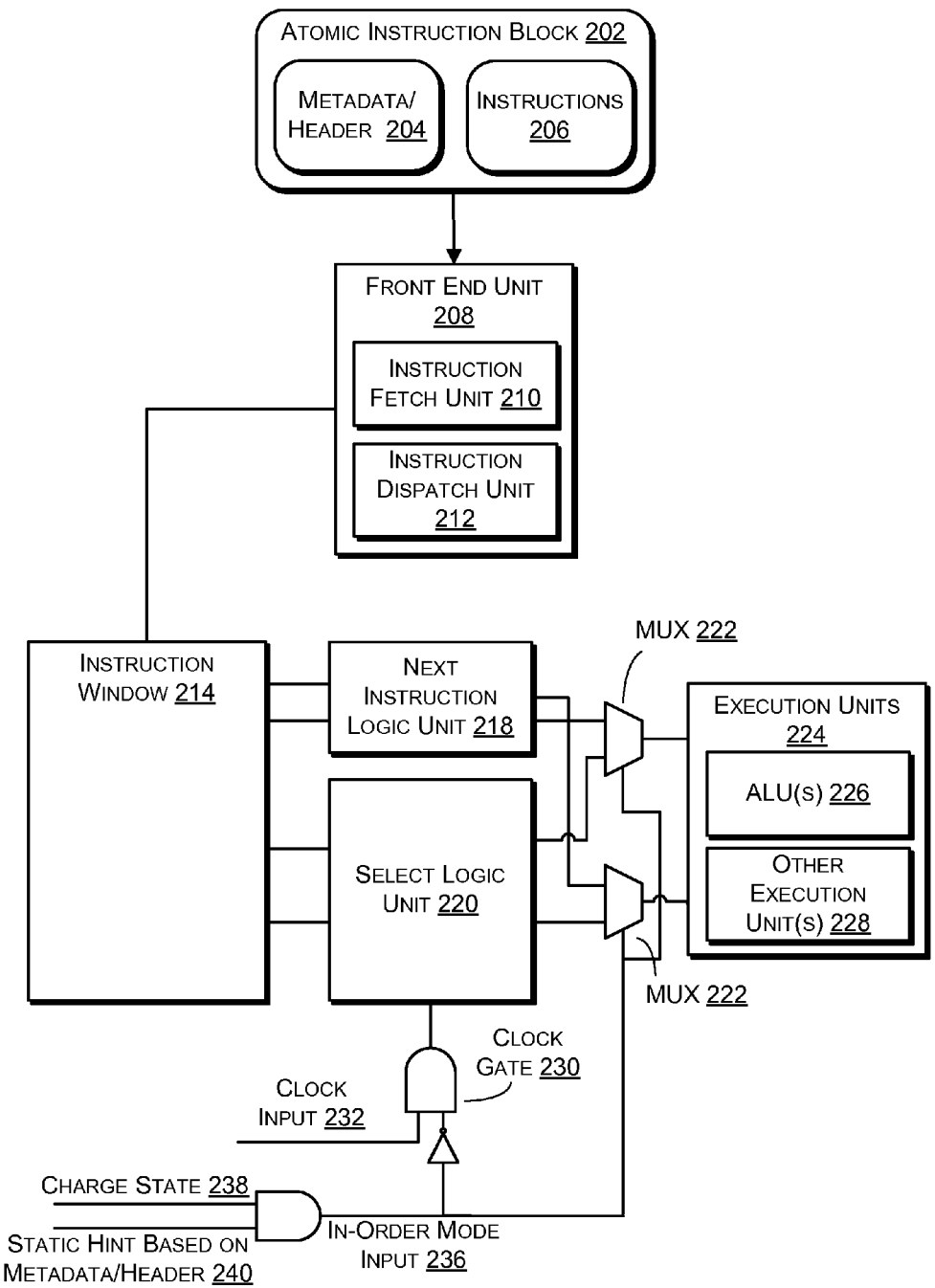

In FIG. 2B, the other input line 236 indicates whether the instructions 204 are suitable for in-order execution based on a logical AND of a charge state 238 of the computing device and a static hint 240 based on the metadata 206. The static hint 240 based on the metadata 206 may be the same static hint described above with regard to FIG. 2A. The charge state 238 may be set to '1' when a battery of the computing device 102 is being used. Thus, the other input line may indicate that the instructions 204 are suitable for in-order execution with a '1' when both the static hint 240 indicated that the instructions 204 are suitable for in-order execution and the battery of the computing device 102 is being used. In alternative embodiments other logic may be used, such as logic to cause the other input line to indicate that the instructions 204 are suitable for in-order execution with a '1' when either the static hint 240 indicated that the instructions 204 are suitable for in-order execution or the battery of the computing device 102 is being used.

Figure 2C:
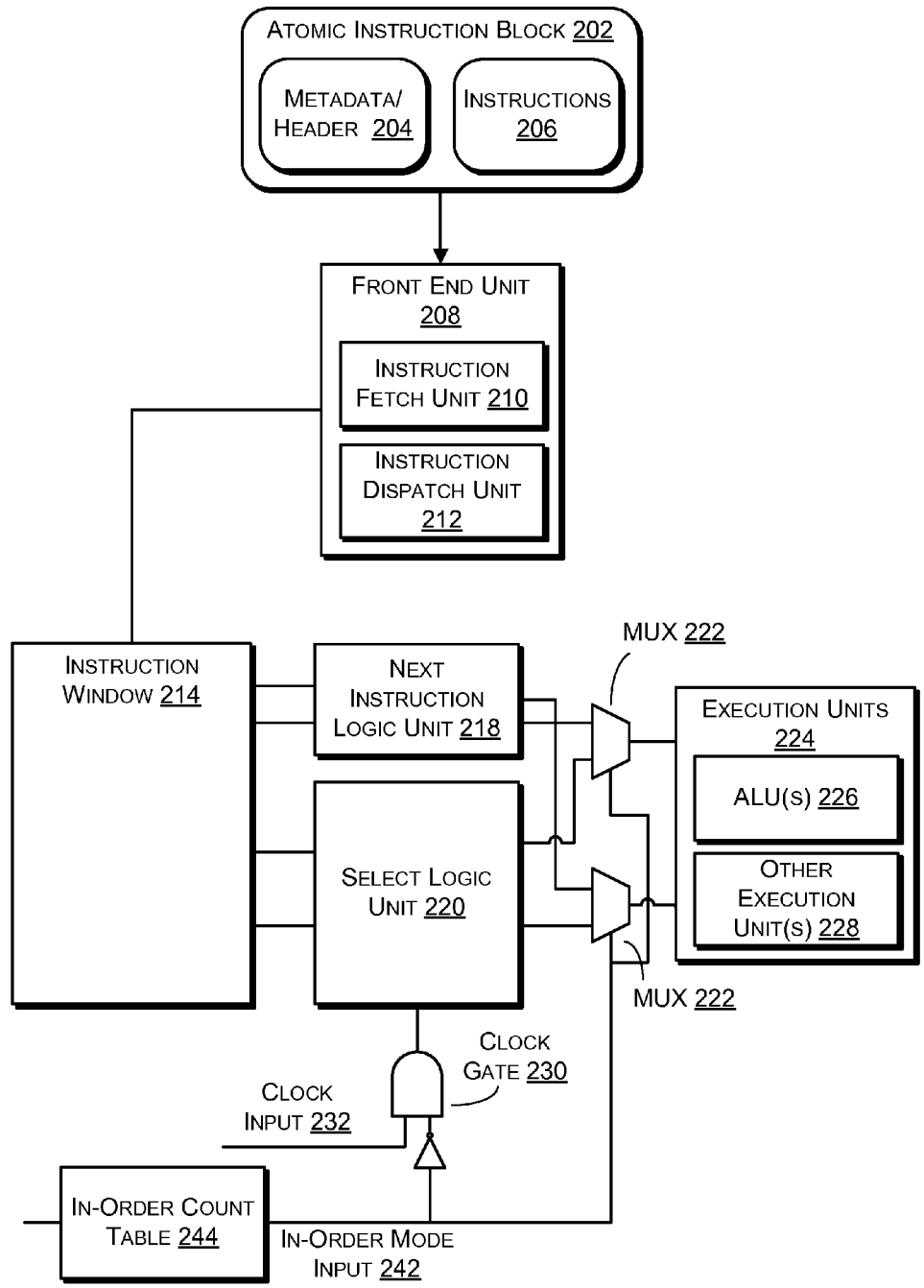

In FIG. 2C, the other input line 242 indicates whether the instructions 204 are suitable for in-order execution based on contents of a table 244 of the processor microarchitecture. The table 244 may be built dynamically, adjusting a count of times that instructions issue in order for each atomic instruction block 202. The table 244 may associate identifiers of atomic instruction blocks 202, such as addresses of atomic instruction blocks 202, with these counts. Each time instructions 204 of an atomic instruction block 202 issue in order, the count for that atomic instruction block 202 is incremented. Each time instructions 204 of an atomic instruction block 202 issue out of order, the count for that atomic instruction block 202 is decremented. A threshold may be applied to the counts, with counts meeting or exceeding the threshold indicating that the next instructions 204 in the instruction window 214 are suitable for in order execution.

In FIGS. 2A-2C, the logic unit examining the metadata 206, charge state 238, and table 244 and building the table 244 may be any one or more logic units of the processor microarchitecture. The logic unit(s) may be a detector logic unit specific to examining the metadata 206, charge state 238, and table 244 and building the table 244 or may be another logic unit (e.g., front end unit 208) that also serves other purposes.

Figure 2D:
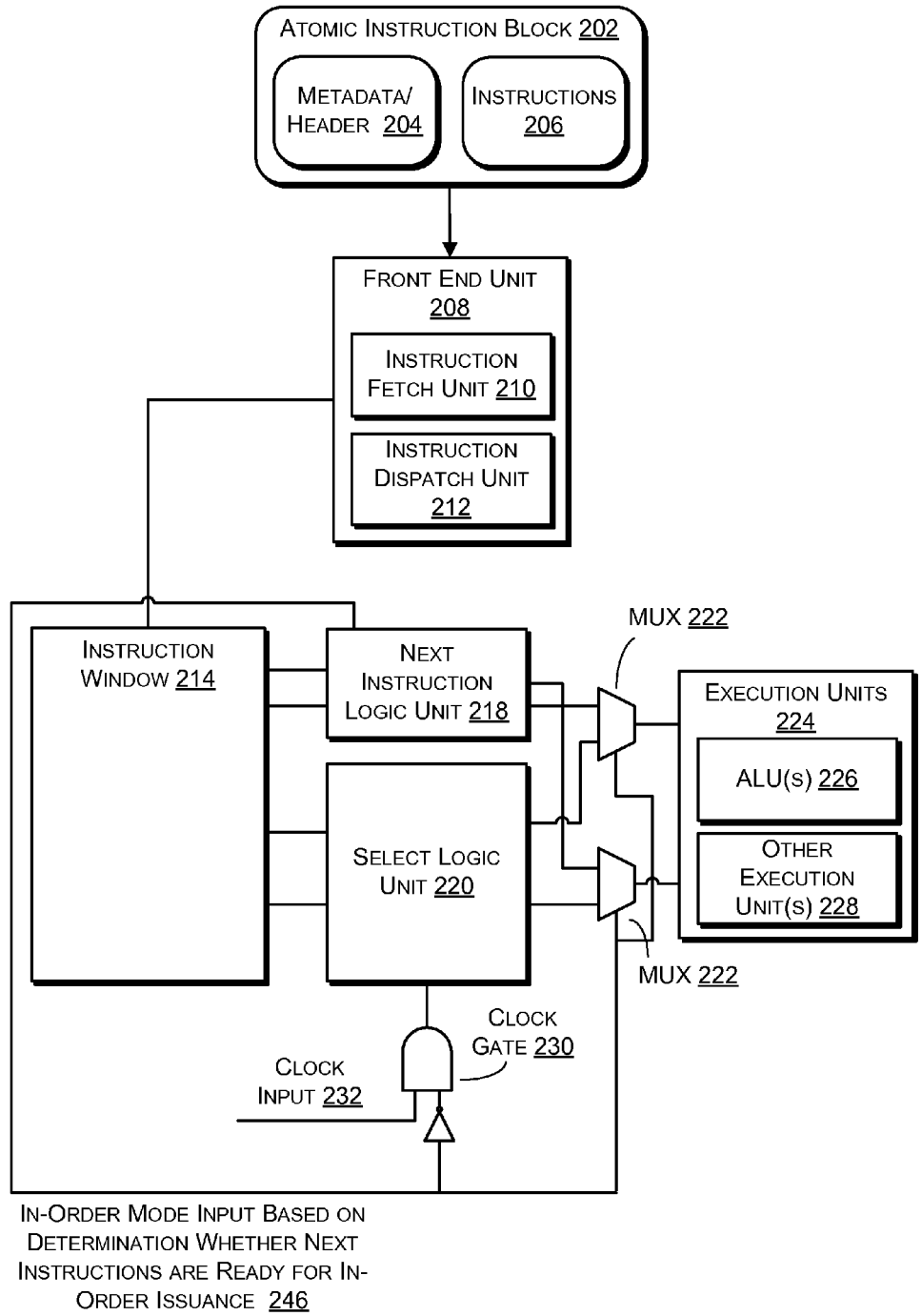

In FIG. 2D, the next instruction logic unit 218 may determine whether the next instructions 204 in the instruction window 214 are suitable for in order execution and may set the input to the other input line 246 accordingly. The next instruction logic unit 218 may be configured to determine if the next unissued instructions 204 in linear order in the instruction window 214 are ready to issue and, based on that determination, to provide an output which serves as an input for the other input line 246.

Example Operations

Figure 3:
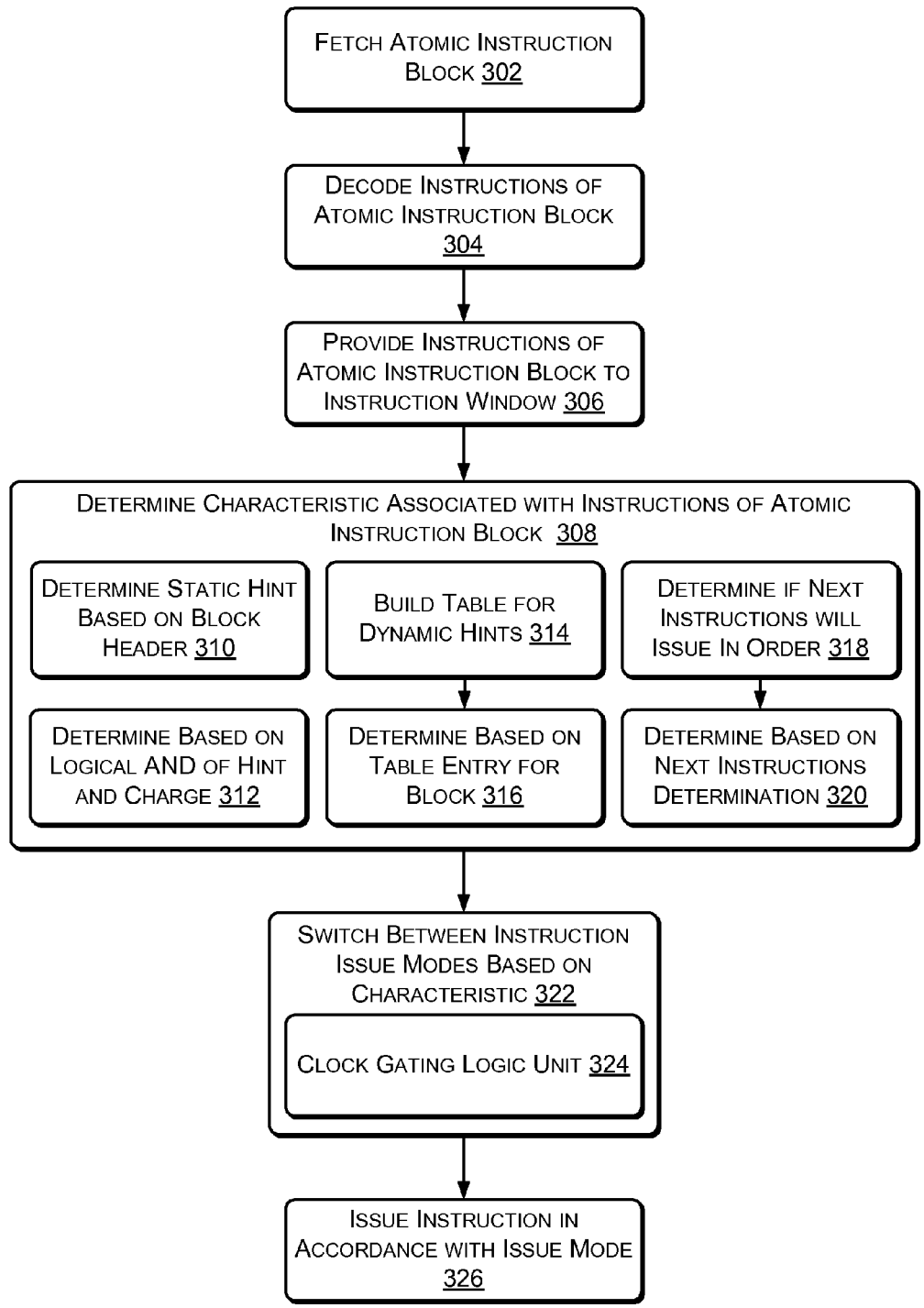
FIG. 3 is a flowchart showing an illustrative process for switching between a first instruction issue mode of a processor and a second instruction issue mode of the processor based at least in part on a characteristic associated with a plurality of instructions.

FIG. 3 is a flowchart showing an illustrative process for switching between a first instruction issue mode of a processor and a second instruction issue mode of the processor based at least in part on a characteristic associated with a plurality of instructions. The operations of the processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

As illustrated at block 302, a processor may fetch an atomic instruction block. The atomic instruction block may be fetched by an instruction fetch unit of the processor. Further, the atomic instruction block may include a plurality of instructions, such as EDGE instructions specifying target instructions that will consume instruction results as operands. The atomic instruction block may also include a header with metadata specified by a compiler. Such metadata may include a static hint, the static hint indicating whether the instructions are suitable for in-order execution.

At block 304, the processor may decode the instructions of the atomic instruction block and, at block 306, the processor may provide decoded ones of the instructions of the atomic instruction block to an instruction window of the processor. The decoding and providing may be performed by an instruction dispatch unit of the processor.

At block 308, the processor may determine a characteristic associated with instructions of the atomic instruction block. Such a determination may be made by any one or more units of the processor. At 310, determining the characteristic may comprise determining that the metadata of the atomic instruction block includes a static hint indicating whether the instructions are suitable for in-order execution. At 312, determining the characteristic may comprise performing a logical AND of the static hint included in the header and a charge state of a computing device which includes the processor.

At 314, the processor may build a table by incrementing a count associated with an identifier of the atomic instruction block when instructions of the atomic instruction block issue in order and decrementing the count associated with that identifier of the atomic instruction block when instructions of the block of instructions issue out of order. The count may be associated with an instruction issue mode based on a threshold. At 316, determining the characteristic may comprise consulting the table and determining the count or the instruction issue mode associated with the count and the identifier of the atomic instruction block.

At 318, one of the logic units of the processor may determine whether next instructions in the instruction window are ready to issue in order. The logic unit may be the logic unit of the processor that implements the in-order instruction issue mode. At 320, determining the characteristic may comprise setting the characteristic based on the determining that the next instructions are ready to issue in order.

At 322, the processor may switch between a first instruction issue mode and a second instruction issue mode based at least in part on the determined characteristic. The first instruction issue mode and the second instruction issue mode may be associated with different energy consumption characteristics. Further, one of the instruction issue modes may be an out-of-order instruction issue mode, and the other may be an in-order instruction issue mode. Each of the in-order instruction issue mode and out-of-order instruction issue mode may be implemented by a different logic unit of the processor, and the processor may include circuitry for switching between those logic units. In some embodiments, the circuitry may include a line coupled to one of the logic units, such as the logic unit implementing the out-of-order instruction issue mode, which activates the logic unit with input indicative of the determined characteristic. At 324, the switching may include clock gating the logic unit implementing the out-of-order instruction issue mode. In such embodiments, the line coupled to the logic unit implementing the out-of-order instruction issue mode may be coupled to a clock gate, the clock gate having input lines for receiving a clock signal of the processor and for receiving input indicative of the determined characteristic. In some embodiments, the line for receiving input indicative of the determined characteristic may be coupled to the clock gate through an inverter.

At 326, the active, switched-to logic unit of the processor may issue instructions from the instruction window in accordance with the instruction issue mode implemented by that logic unit. The instructions may then be provided to another unit, such as an ALU or a load/store queue.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A processor-implemented method comprising:
receiving an atomic instruction block which includes a plurality of instructions;
determining a characteristic of the atomic instruction block based at least in part on metadata associated with the atomic instruction block, the metadata set by a compiler, or on an identifier associated with the atomic instruction block; and
switching between an out-of-order instruction issue mode of a processor and an in-order instruction issue mode of the processor based at least in part on the characteristic and a charge state of a computing device which includes the processor for executing at least a portion of the plurality of the instructions, wherein the out-of-order instruction issue mode and the in-order instruction issue mode are associated with different energy consumption characteristics.

2. The processor-implemented method of claim 1, wherein the switching comprises clock gating a logic unit of the processor, wherein the logic unit is for selecting instructions of the atomic instruction block in the out-of-order instruction issue mode.

3. The processor-implemented method of claim 1,
wherein the metadata includes a static hint indicating whether the instructions of the block of instructions are suitable for in-order execution, or
wherein the identifier of the atomic instruction block is used as an index to a table of the processor, the table associating each atomic instruction block with one of the out-of-order instruction issue mode or the in-order instruction issue mode.

4. A processor-implemented method comprising:
determining a characteristic associated with a plurality of instructions, the plurality of instructions comprising an atomic instruction block that includes metadata in a header of the atomic instruction block;
determining that the metadata includes a static hint, the static hint indicating whether the plurality of instructions are suitable for in-order execution; and
switching between a first instruction issue mode of a processor and a second instruction issue mode of the processor based at least in part on the characteristic and based at least in part on a combination of the static hint and a charge state of a computing device that includes the processor, wherein the first instruction issue mode and the second instruction issue mode are associated with different energy consumption characteristics.

5. The processor-implemented method of claim 4, wherein the first instruction issue mode is an out-of-order instruction issue mode and the second instruction issue mode is an in-order instruction issue mode.

6. The processor-implemented method of claim 5, wherein the switching comprises clock gating a logic unit of the processor, wherein the logic unit is for selecting instructions in the out-of-order instruction issue mode.

7. The processor-implemented method of claim 4, further comprising:
determining, by a logic unit of the processor for selecting instructions in the in-order instruction issue mode, whether next instructions in an instruction window are ready to issue in order; and setting, by the logic unit, the characteristic based on the determining that the next instructions are ready to issue in order.

8. A processor comprising:
a first logic unit for selecting instructions from an instruction window in an out-of-order instruction issue mode;
a second logic unit for selecting the instructions from the instruction window in an in-order instruction issue mode; and
circuitry for switching between the first logic unit and the second logic unit, the circuitry comprising a line coupled to the first logic unit for activating the first logic unit based on an input to the line, the input based at least in part on a static hint indicating whether the instructions are suitable for in-order execution, and the static hint based at least in part on i) metadata associated with the instructions, ii) on a charge state of a computing device which includes the processor, or iii) on both the metadata and the charge state.

9. The processor of claim 8, further comprising a third logic unit to fetch additional instructions as an atomic instruction block, to decode the additional instructions, and to provide at least a subset of the additional instructions to the instruction window.

10. The processor of claim 8, wherein the circuitry further comprises a clock gate coupled to the line, the clock gate being further coupled to a line for receiving a clock signal and a line for receiving the input, the clock gate transmitting the input on the line coupled to the first logic unit when receiving both the input on the line for receiving the input and the clock signal on the line for receiving the clock signal.

11. The processor of claim 8, wherein the input is received from the second logic unit, the second logic unit being configured to determine whether next instructions in the instruction window are ready to issue in order and to provide the input based on that determination.

12. A processor-implemented method comprising:
determining a characteristic associated with a plurality of instructions, the plurality of instructions comprising an atomic instruction block;
switching between a first instruction issue mode of a processor and a second instruction issue mode of the processor based at least in part on the characteristic, wherein the first instruction issue mode and the second instruction issue mode are associated with different energy consumption characteristics;
consulting a table of the processor that associates the atomic instruction block with one of the first instruction issue mode or the second instruction issue mode; and
building the table by incrementing a count associated with the atomic instruction block when instructions issue in-order for the atomic instruction block and decrementing the count associated with the atomic instruction block when instructions issue out-of-order for the atomic instruction block, wherein the count is associated with one of the first instruction issue mode or the second instruction issue mode based on a threshold.

13. A processor comprising:
a first logic unit for selecting instructions from an instruction window in an out-of-order instruction issue mode;
a second logic unit for selecting instructions from the instruction window in an in-order instruction issue mode;
circuitry for switching between the first logic unit and the second logic unit, the circuitry comprising a line coupled to the first logic unit for activating the first logic unit based on an input to the line;
a table, wherein the input is based on the table, which associates blocks of instructions with one of the out-of-order instruction issue mode or the in-order instruction issue mode; and
circuitry for building the table by incrementing a count associated with a block of instructions when instructions of the block of instructions issue in-order and decrementing the count associated with that block of instructions when instructions of the block of instructions issue out-of-order, wherein the count is associated with one of the out-of-order instruction issue mode or the in-order instruction issue mode based on a threshold.

* * * * *